US011483696B2

(12) United States Patent
Velusamy (10) Patent No.: US 11,483,696 B2
(45) Date of Patent: Oct. 25, 2022

(54) RICH USER EXPERIENCE FOR SERVICE UPGRADES

(71) Applicant: T-Mobile USA, Inc., Bellevue, WA (US)

(72) Inventor: Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 45 days.

(21) Appl. No.: 16/581,682

(22) Filed: Sep. 24, 2019

(65) Prior Publication Data

US 2021/0092587 A1     Mar. 25, 2021

(51) Int. Cl.
| | |
|---|---|
| *H04W 8/12* | (2009.01) |
| *H04W 4/50* | (2018.01) |
| *H04W 4/24* | (2018.01) |
| *H04W 4/02* | (2018.01) |
| *H04W 4/16* | (2009.01) |

(52) U.S. Cl.
CPC ............ *H04W 8/12* (2013.01); *H04W 4/027* (2013.01); *H04W 4/16* (2013.01); *H04W 4/24* (2013.01); *H04W 4/50* (2018.02)

(58) Field of Classification Search
CPC . H04W 4/029; G06Q 10/025; G06Q 30/0641; G06Q 10/06375; G06Q 20/32; G06F 15/177; H04L 41/5054; H04L 41/0806; Y02P 90/90
See application file for complete search history.

(56) References Cited

U.S. PATENT DOCUMENTS

| | | | | |
|---|---|---|---|---|
| 6,081,705 A | * | 6/2000 | Houde | ............... H04W 8/26 455/411 |
| 8,839,387 B2 | * | 9/2014 | Raleigh | ............... H04M 15/49 726/7 |
| 9,008,666 B1 | * | 4/2015 | Reeves | ............ H04W 36/0072 455/437 |

(Continued)

OTHER PUBLICATIONS

Verizon advertisement video entitled "Add an International Travel Plan with the My Verizon App", 2 pages, 15 second video. Retrieved from the Internet on May 21, 2019: <https://www.verizonwireless.com/support/my-verizon-app-international-travel-video>.

(Continued)

*Primary Examiner* — Mansour Oveissi
(74) *Attorney, Agent, or Firm* — Han Santos, PLLC (57) ABSTRACT

A wireless telecommunications device user's home telecommunications service provider determines that the user is traveling or about to travel to a foreign jurisdiction where telecommunications services are provided by a different telecommunications service provider, and proactively provides the user with options for selecting or upgrading telecommunications service and receives a selection from the user before the user leaves the home jurisdiction or ceases contact with the home service provider. When the user arrives in the foreign jurisdiction, upgraded service per the user's selection is established or soon ready to become active. The home service provider can determine the user's travel based on one or more of the user's electronic communications, calendar entries, current location, trending geographical movement, or patterns of past travels.

20 Claims, 3 Drawing Sheets

(56) References Cited

U.S. PATENT DOCUMENTS

| 9,398,169 B2 | 7/2016 | Mohammed et al. | |
| 2018/0218463 A1* | 8/2018 | Jobling | H04W 4/029 |
| 2019/0208461 A1* | 7/2019 | Willmot | H04W 28/18 |

OTHER PUBLICATIONS

Samiljan, Tom. 4 Reason to Love Google Now [online], Jun. 9, 2014 [retrieved on Sep. 24, 2019]. Retrieved from the Internet: <https://www.travelandleisure.com/blogs/4-reasons-to-love-google-now>.

* cited by examiner

RICH USER EXPERIENCE FOR SERVICE UPGRADES

BACKGROUND

In today's world users often take their wireless communications devices (user devices) when traveling to foreign countries and expect to use both voice and data services with their user devices when they arrive in foreign jurisdictions where the wireless telecommunications service provider with which they have a service account does not provide direct services. In these situations, business arrangements between wireless telecommunications service providers in different jurisdictions can enable users who move from a home jurisdiction (where they have a service account with a wireless telecommunications service provider providing service in the home jurisdiction) into a foreign jurisdiction, to receive wireless voice and/or data services from a wireless telecommunications service provider in the foreign jurisdiction. The foreign wireless telecommunications service provider can convey an accounting of services usage and charges incurred to the home wireless telecommunications service provider so that the user can be billed for those services through the home jurisdiction service account. The business arrangements can vary from simple billing agreements and an understanding that the foreign wireless telecommunications service provider sets rates for the visiting user, to negotiated service packages or options that the foreign wireless telecommunications service provider will provide to customers of the home wireless telecommunications service provider.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

This disclosure is directed to systems and techniques for efficiently arranging wireless telecommunications services for users traveling to a foreign jurisdiction to use after they arrive in the foreign jurisdiction. One challenge to performing this efficiently is that when a user's wireless device is roaming within a foreign jurisdiction, the user's device is often allotted a limited bandwidth for data communications, for example, in a default or basic service package available to the user upon arrival in the foreign jurisdiction. The user's home telecommunications service provider may provide an option to upgrade while in the foreign jurisdiction, however this can be problematic or cumbersome if that upgrade process requires the user to navigate web-based menu selections using the limited bandwidth allotted to the user.

In accordance with example embodiments, the user's home telecommunications service provider discerns that the user is traveling or about to travel to a foreign jurisdiction where telecommunications services are provided by a different telecommunications service provider, and in response provides the user with options for upgrading telecommunications service (e.g., increased bandwidth and/or data services) in the foreign jurisdiction that can be selected before the user leaves the home jurisdiction, for example, before the user's wireless telecommunications device leaves the home telecommunications service provider network for which the user is a customer and subscriber. Thus, when the user arrives in the foreign jurisdiction, upgraded telecommunications service commensurate with the user's selection is established or ready for the user to activate. The home telecommunications service provider can for example communicate with the user via the user's device to provide the user with options for upgrading telecommunications service in the foreign jurisdiction. As noted in greater detail further below, the home telecommunications service provider can discern or determine that the user is traveling or about to travel and leave the home jurisdiction for a foreign jurisdiction based on one or more of the user's email communications, calendar entries, current location, trending geographical movement, or patterns of past travels by the user.

Figure 1:
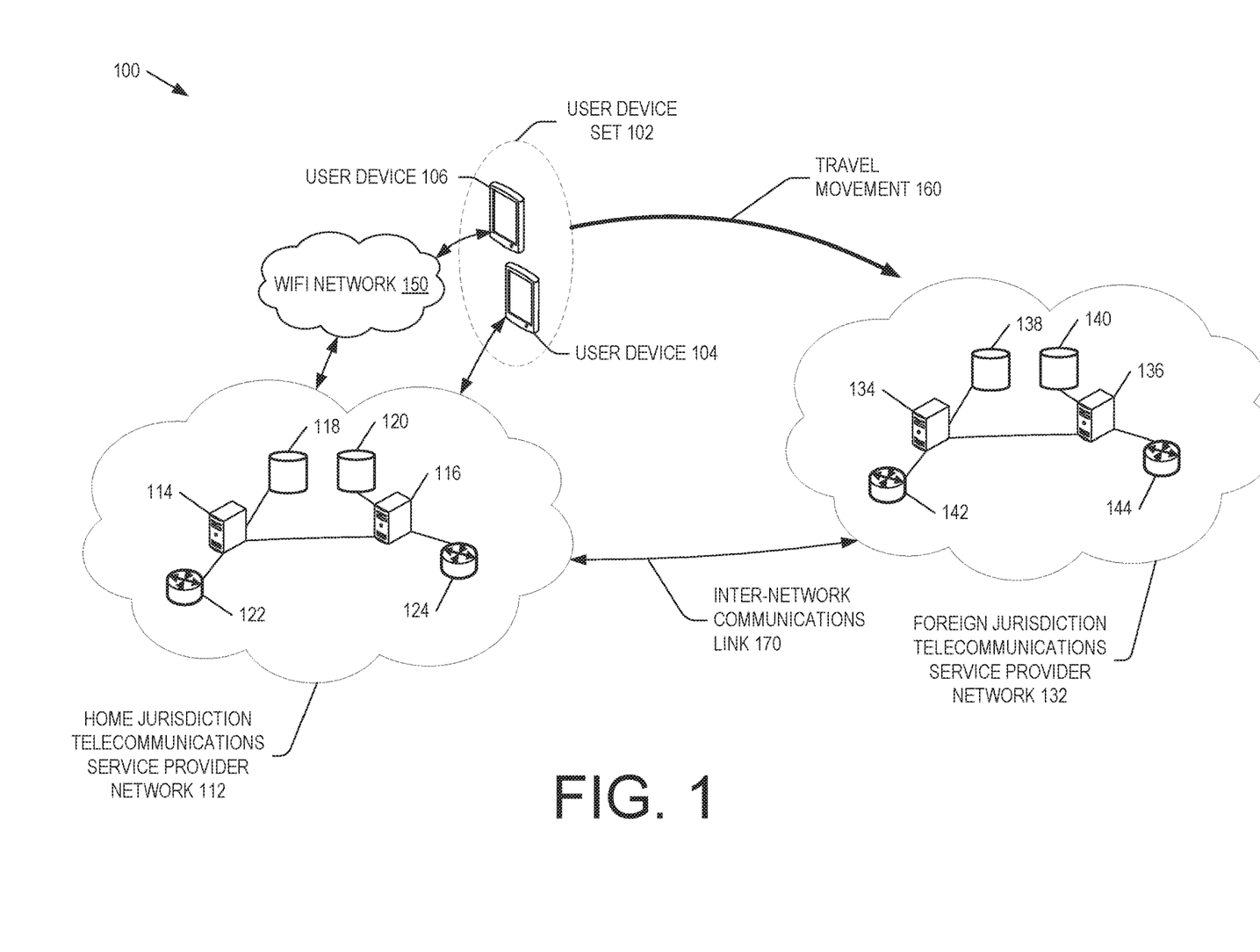
FIG. 1 shows an illustrative computing environment and network architecture for implementing techniques that enable users traveling to different wireless telecommunications jurisdictions outside their home jurisdiction to efficiently arrange for wireless telecommunications services in the different jurisdictions.

FIG. 1 shows an illustrative computing environment 100 and network architecture for establishing wireless telecommunications service with upgraded service, for example increased bandwidth, in a foreign wireless telecommunications service jurisdiction for a user. In example embodiments, the user selects the upgraded service before leaving the user's home wireless telecommunications service jurisdiction or home wireless telecommunications service provider network.

In particular, FIG. 1 shows a home telecommunications service provider network 112 in a home jurisdiction and a foreign telecommunications service provider network 132 in a foreign jurisdiction. User devices such as the user device 106 and user device 104 are in wireless communication with the home network 112, either directly as in the case of the user equipment 104, or through an intermediate communication medium such as the Wi-Fi network 150 as in the case of the user device 106. As indicated by the travel movement 160 the user devices 104, 106 are destined or in transit to leave the home network 112 and come into communications contact with the foreign network 132.

The user devices 104, 106 can be a wireless cell phone, a tablet with wireless communication ability, or any other electronic device with ability to communicate wirelessly with a telecommunications service provider network. The user device 104 and the user device 106 can optionally both belong to a same user or a same subscriber account such as different user devices belonging to different members of a family having one service account with the home telecommunications service provider, and in those situations can be considered as a set such as the user device set 102. In the case of device sets, one service upgrade selection can be applied to all of the user devices in the set. In other embodiments the user device 104 and the user device 106 can be considered to belong to different users who make independent service upgrade selections for their respective devices. As those of ordinary skill in the art will appreciate, although two user devices are shown, the same principles can apply to greater or fewer numbers of user devices.

The home network 112 includes infrastructure to support functions and services provided by the home telecommunications service provider network. That infrastructure can include, for example, routers, servers and data stores such as the routers 122 and 124, servers 114 and 116, and data stores 118, 120. The foreign network 132 also includes infrastructure to support functions and services provided by the foreign telecommunications service provider network. That infrastructure can include, for example, routers, servers and data stores such as the routers 142 and 144, servers 134 and 136, and data stores 138, 140. Also shown in FIG. 1 is an inter-network communications link 170, by which the home network 112 and the foreign network 132 can communicate with each other, for example to establish upgraded telecommunications service for users visiting one network from another network, relay accounting information, and generally support communications between the networks that enable or support cooperation and business transactions between them. The link 170 can variously include virtual private network tunnels through the Internet, undersea cable communication networks, wireless satellite communications networks, or any other viable or appropriate communication conduit.

In a first example embodiment, the home network 112 detects or infers that a user will soon be leaving the home network 112 for a foreign network 132 based on a location of the user. For example, if the user's user device indicates a presence in the home network 112 that corresponds to a place of departure travel to a foreign jurisdiction such as a maritime port or ferry terminal, a border crossing, or an airport, then the home network 112 can initiate contact with the user and send a communication to the user's device inquiring whether the user will travel to the foreign jurisdiction and optionally providing service upgrade options for telecommunications services in the foreign jurisdiction that the user can select from. In situations where there are multiple possible foreign jurisdictions that the user could be traveling to, the home network 112 can wait until receiving a reply from the user before presenting service upgrade options for selection by the user. Position location information can include, for example, triangulation information from wireless service radio communication towers that the user's device is in communication with, Global Positioning System (GPS) information provided to the home network 112 from the user's device and captured by a GPS receiver in the user's device, or other known positions of services that the user's device is interacting with, for example the geographic location of a Wi-Fi hotspot that the user's device is connected to. Example Wi-Fi hotspots can include, for example, a Wi-Fi hotspot located in a restaurant or lounge in an airport, or an airline Wi-Fi service that is associated with a particular airline or even a specific aircraft. In the case of an airline Wi-Fi hotspot or communication node through which the user's device can access the Internet and/or the home network 112, location and/or identity information of the hotspot or node can suggest or confirm that the user is on an aircraft and will travel soon to a foreign jurisdiction.

In a second example embodiment, the home network 112 infers or determines from a movement trajectory of the user's device that the user is or will be traveling to a foreign wireless telecommunications jurisdiction, and proactively reach out to the user communicating with the user's device while the user's device is still within reach of the home network 112 to confirm the user's travel plans and/or present telecommunications service upgrades (for example, increased bandwidth or data services) for use in the foreign jurisdiction. For example, if the user is traveling consistently toward a national border and/or a services boundary of the home network and at a rate suggesting that the user will depart the home nation or home network 112 within a predetermined amount of time, for example tens of minutes or one to several hours, then the home network 112 can conclude that the user is leaving the jurisdiction of the home network 112 and initiate communications with the user regarding service upgrades in a foreign jurisdiction, for example an adjacent foreign jurisdiction or a likely foreign jurisdiction destination given the user's travel trajectory.

The home network 112 can also consider how much longer the user and her device will remain in the jurisdiction of the home network 112 before leaving the home jurisdiction given a current travel trajectory and speed, to decide when to reach out to the user regarding service upgrade options for use in a foreign telecommunications jurisdiction. For example, the home network 112 might wait until the user is close to a boundary of the home jurisdiction before initiating communications with the user regarding foreign jurisdiction telecommunications service upgrade options, to be certain with a higher degree of probability that the user does in fact intend to leave the home jurisdiction.

In addition, the home network can also initiate communications with the user regarding foreign jurisdiction telecommunications service upgrade options after the user crosses a predetermined threshold that represents a minimum distance away from the boundary and/or a minimum time before the user crosses the boundary, to help ensure that the user has enough time to receive and consider the communication from the home network 112, and to select among foreign jurisdiction telecommunications service upgrade options provided in communications from the home network 112 and respond to the home network 112 with a selection. This could be a longer amount of time when the user appears to be guiding their own transportation (as in driving a car) and thus has multiple demands on her attention and needs more time to see, evaluate and respond to the communication, such as 30-60 minutes in advance, or a shorter time such as 10-20 minutes, when the trajectory pattern suggests that the user is on public transportation and thus may be more promptly attentive to incoming communications on the user's device. In terms of distance, a distance of the user's device from a telecommunications service boundary and/or a governmental or national boundary (where travel across a governmental boundary also indicates or correlates with travel across and outside a telecommunications service boundary, for example) that drops below a predetermined threshold, such as hundreds of yards, or one or several miles, can also function as a trigger for the home network 112 to initiate communications with the user regarding telecommunications service upgrades. Those of ordinary skill in the art will recognize that other time intervals and/or physical distances can be selected and used.

In a third example embodiment, the home network 112 determines that a user is likely to travel to a foreign telecommunications jurisdiction based on historical travel and behavior patterns of the user. For example, if the user takes annual trips to a particular country for vacation or business, or takes monthly business trips to a neighboring country, those patterns can form a basis for the network 112 to anticipate that an upcoming trip to a foreign telecommunications jurisdiction is likely, and initiate communications regarding possible telecommunications service upgrades in the foreign jurisdiction. In addition, the network 112 can use the user's historic usage patterns of telecommunications services while on past trips as well and/or wireless telecommunications service upgrades (e.g., bandwidth) that the user has selected in the past, to prepare telecommunications service upgrade options that include possibilities that match well with the user's past needs. This historical information can be gleaned from billing and profile records of the user, and optionally can be combined with past calendar and travel itinerary information that the user has made available to the network 112, or with other sources of historical information regarding the user.

In a fourth embodiment, the home network 112 determines or infers that the user will be or is traveling to a foreign telecommunications jurisdiction by observing electronic communications to and from the user's telecommunications device, and information in the user's calendar (on the user's device and/or stored within the network 112 and accessible to the user). Hotel reservations, flight information, train tickets, activities or events scheduled for the user in one or more foreign telecommunications jurisdictions, and similar information indicating that user will travel to and/or be in a foreign telecommunications jurisdiction can alert the home network 112 to communicate with the user regarding telecommunications service upgrades in the foreign jurisdiction, for example when a time until the impending travel falls below a predetermined threshold, whether it be days, hours or minutes.

In various example embodiments, the user selects and sets privacy policies and boundaries to control which data is shared with network provider 112, and when and under what conditions that data is shared with or accessible to the network provider 112. Electronic communications to and/or from the user's device can include, for example, email messages, Short Message Service (SMS) messages, information received and/or sent from software applications on the user's device (including electronic calendar entries or updates) that the user has authorized to be shared with the network provider, and so forth. Relevant software applications on the user's device can include, for example, a calendar application, a digital assistant application, applications that facilitate communications with transportation providers and/or providers of travel-related services, and so forth. In addition to or as part of setting privacy and involvement parameters, in example embodiments the user can set parameters or constraints on when and how the network provider proactively reaches out to the user with foreign jurisdiction service upgrade options or inquiries. For example, the user can request earlier lead time, later lead time, a degree of confidence that should exist before the network provider reaches out, a maximum frequency (e.g., ask only once, or twice, etc. for a given detected trip), a number or timing of reminder inquiries, and so forth.

Features and mechanisms from the embodiments described herein can be variously combined. Presence information, trajectory information, historic usage patterns, and information in the user's electronic communications and calendar referring to past and/or future events and travel can all be variously and selectively combined to form a basis for the home network 112 to detect or predict likely travel of the user out of the home telecommunications jurisdiction to one or more foreign telecommunications jurisdictions, and then present telecommunications service upgrade options for the user to select from before the user departs the home telecommunications jurisdiction.

In an example embodiment, communications between the user and the home network 112 occur in multiple stages. For example, in one scenario, the home network 112 reaches out to confirm whether the user plans to travel, and the user can respond by confirming, negating, or asking the home network 112 to inquire again later. In addition, the user can provide feedback on options presented and request different options, so that communications between the home network 112 and the user regarding telecommunications service upgrade options in foreign jurisdictions can be iterative. In example embodiments, there are multiple wireless telecommunications service providers in the foreign jurisdiction and the network 132 can be one of multiple corresponding networks in the foreign jurisdiction. In these embodiments, options presented to the user can enable the user to select among the different providers, and can include service upgrade options or service plans from different wireless telecommunications service providers in the foreign jurisdiction.

As noted earlier, an objective in example embodiments is to provide foreign jurisdiction telecommunications service upgrade options to a user for selection and to receive the user's selection before the user's wireless telecommunications device (with the user) leaves the home jurisdiction of the home network 112, for example so that those communications are efficiently, accurately and/or speedily performed. As noted earlier with respect to the fourth example embodiment and applicable to multiple embodiments, upgrade options and packages can be tailored to the user. For example, one or more of historic service usage in foreign telecommunications jurisdictions, specific activities scheduled in a foreign telecommunications jurisdiction, or a profile including preferences of the user can all be variously used by the home network 112 to create or select upgrade options for presentation to the user for the user to choose from. For example, if the user's calendar indicates that the user is going to a foreign telecommunications jurisdiction for a business trip or to attend a scholastic or industry conference, the home network 112 may infer that the user will likely need more services and/or bandwidth than if the user were touring the foreign telecommunications jurisdiction on a personal vacation, and tailor the options accordingly. In an example embodiment, when the home network 112 knows that the user will be departing the home jurisdiction for a foreign jurisdiction but doesn't know which foreign jurisdiction the user intends as the destination, the home network 112 can prepare a set of generic telecommunications service upgrade options for the user to select from, and can then establish or activate an available option in the foreign jurisdiction where the user arrives, that is similar to, or within predetermined tolerances of, the generic plan that the user selected.

After the user has made a selection, the selected telecommunications service can be established in the foreign telecommunications jurisdiction by the home network 112 communicating with the foreign network 132, for example via the inter-network communications link 170, to set up telecommunications service in accordance with the user's selection. This communication occurs after the user responds with a selection to the home network 112, and in example embodiments occurs before the user arrives in the foreign telecommunications jurisdiction. In an example embodiment, when the user arrives in the foreign telecommunications jurisdiction and turns on her user device to communicate with the foreign network 132, the foreign network 132 recognizes the user's device in accordance with standards or protocols in effect internationally or specifically between the home network 112 and the foreign network 132, and activates a service plan in accordance with the prior communication between the home network 112 and the foreign network 132 regarding the user. In another example embodiment, for example in a situation where the home network 112 didn't communicate with the foreign network 132 because it didn't know the user's destination, after communicating with the user's device upon the user's arrival in the foreign telecommunications jurisdiction, the foreign network 132 reaches out to the home network 112 and provides identifying information regarding the user to the home network 112. The home network 112 responds with information regarding the user's selection or desired telecommunications services abroad, which enables the foreign network 132 to then set up telecommunications services for the user's device that are consistent with or similar to the user's selection. In another example embodiment, the home network 112 can provide a one-time use code, for example a weblink or a Uniform Resource Indicator (URI) that includes a web address and a unique code, that the user can use to visit a website and activate the selected telecommunications service when in the foreign jurisdiction, or for example a local phone number in the foreign jurisdiction to call and a code to provide to activate the selected telecommunications service.

In example embodiments, the home network 112 can also perform additional services related to the user's travel in accordance with the user's instructions, privacy permissions, and preferences, for example to send an alert to credit card companies from which the user has a credit card to alert them that the user is traveling to or visiting the foreign jurisdiction so that the credit card companies can better detect fraudulent activity on the user's credit accounts and/or ensure that the user has access to desired or critical credit card services while traveling.

Figure 2:
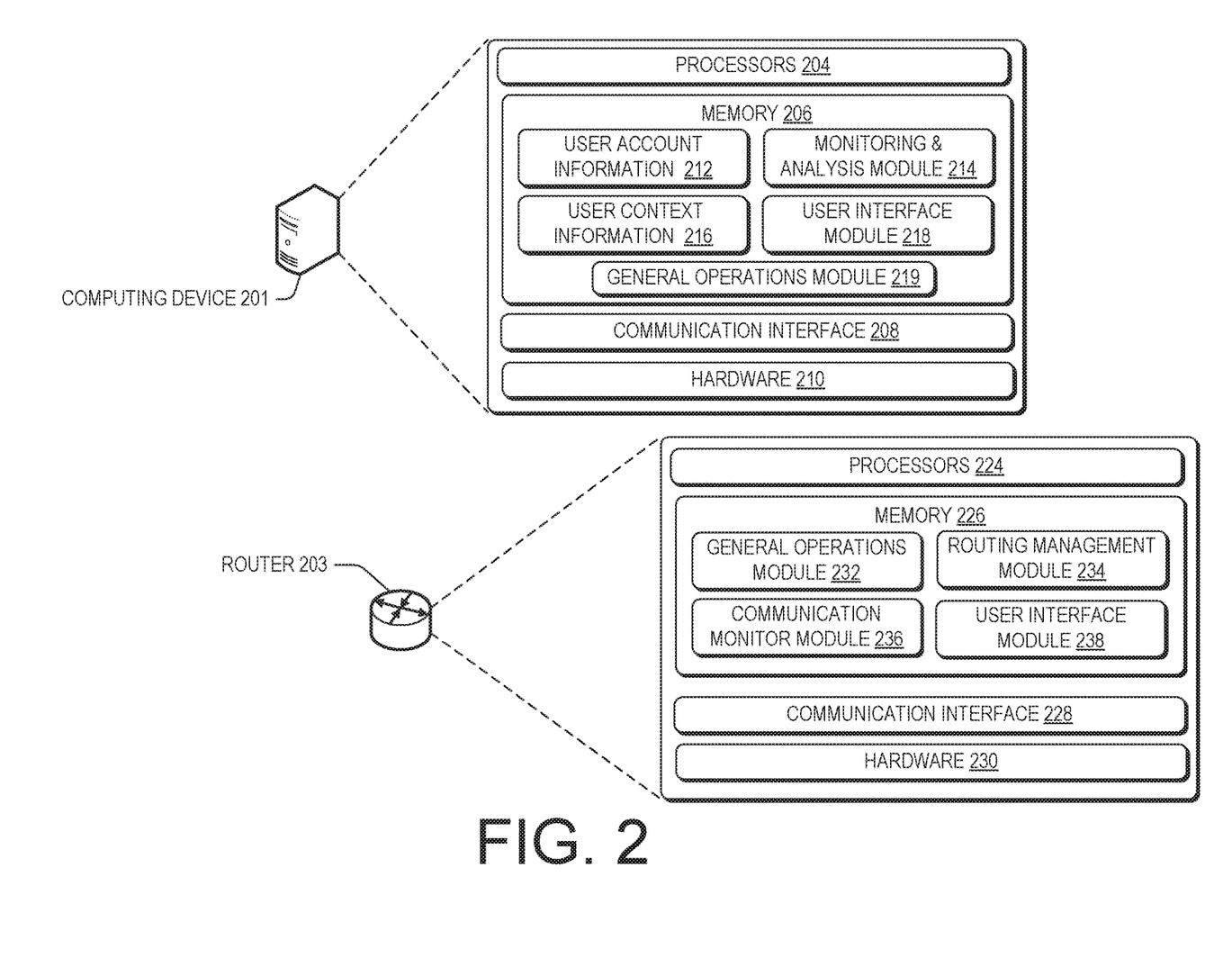
FIG. 2 shows illustrative details for various servers and other devices to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

Figure 3:
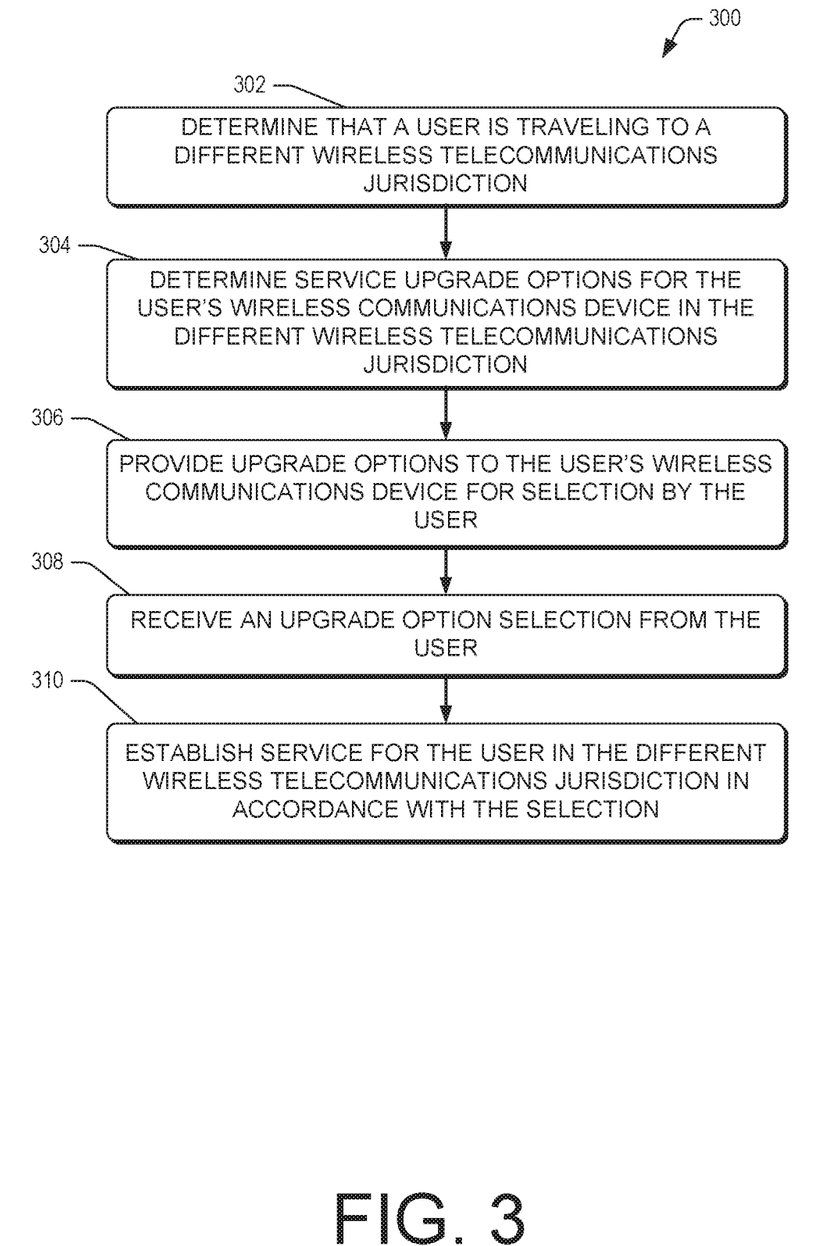
FIG. 3 is a flow diagram of an illustrative process for implementing techniques that enable users traveling to different wireless telecommunications jurisdictions outside their home jurisdiction to efficiently arrange for wireless telecommunications services in the different jurisdictions.

One or more instances of the computing device 201 can for example form a basis for the user devices 104, 106 as well as for other equipment and functions of the telecommunications service provider network 102 including for example the servers 114, 116, 134, 136 as well as various functions described with respect to the process of FIG. 3. Instances of the computing device 201 can also support various functions within the wireless networks 112, 132. The computing device 201 includes processors 204, hardware 210, and a communication interface 208. The computing device 201 also has a memory 206 that includes (but is not limited to) the various software modules shown. A user context information module 216 can facilitate storage of and access to user context information gathered by or through the user devices 104, 106 as well as from other sources. The user account information module 212 can contain information about one or more user accounts with a telecommunications service provider as well as for user accounts with third party entities, from either a client perspective (e.g., information on a user equipment owned or controlled by the user) or from a server/service provider perspective (e.g., information about the user and their account that is resident on, or accessible to, a telecommunications service provider with whom the user has a service subscription or a third party entity providing services to the user). The monitoring and analysis module 214 can support communication monitoring and analysis functions of the servers 114, 116, 134, 136 and routers 122, 124, 142, 144, to support functions of the telecommunications service provider networks 112, 132 as described herein, for example to detect or infer when the user will travel from the home telecommunications jurisdiction to a foreign telecommunications jurisdiction, as well as monitoring and analysis functions in the user devices 104, 106 that can implement and adjust communication functions in cooperation with the communication interface 208. The general operations module 219 can support different functions of various applications running on the computing device 201 including tasks delegated from other devices or services. The user interface module 218 can provide user interface functions and capability for the user devices 104, 106 as well as for the servers 114, 116, 134, 136 to enable users and administrators or technicians to access and operate the user equipment and servers.

One or more instances of the router 203 can be variously located within and support routing functions within the telecommunications service provider networks 112, 132. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example the Wi-Fi network 150 and the user devices 104, 106, to support analysis and management functions performed by the servers 114, 116, 134, 136 or other elements of the telecommunications service providers or telecommunications service provider networks 102, 132 with respect to the services and communications described herein. Also included are a user interface module 238 to facilitate direct communications with a human operator if needed, and a general operations module 232 that can enable the router 203 to accept and accomplish various tasks for the system or subsystem to which it more particularly belongs.

The memories 206, 226 optionally include computer-readable storage media. Computer-readable storage media can include or encompasses volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

FIG. 3 illustrates a process that encompasses embodiments and scenarios variously described herein. In a first block 302, a determination is made that a wireless telecommunications user is leaving or is likely to leave a home wireless telecommunications service jurisdiction to travel to a different, foreign wireless telecommunications service jurisdiction. As variously described herein, in example embodiments the user has at least one user device that is capable of communicating wirelessly with a telecommunications service provider such as through the networks 112, 132 shown in FIG. 1. The home wireless telecommunications service jurisdiction is administered or served by a home wireless telecommunications service provider of which the user is a customer or subscriber, and the foreign wireless telecommunications service jurisdiction includes one or more foreign jurisdiction wireless telecommunications service providers and corresponding networks such as the network 132 shown in FIG. 1. As noted herein, this determination can be made by the user's home wireless telecommunications service provider, and the determination can be based on one or more of a current location of the user's device, a movement trajectory of the user's device, the user's historic travel patterns, or electronic communications or electronic calendar information of the user. From block 302 the process moves to block 304.

In block 304, service upgrade options are determined for the user's device(s) in the different or foreign wireless telecommunications service jurisdiction that the user is traveling to. As described in greater detail elsewhere herein, in example embodiments the upgrade options are determined based on one or more of service options available in the foreign jurisdiction, a past usage history of the user in the foreign jurisdiction, historic activities of the user, scheduled activities or events in the foreign jurisdiction that are noted in the user's electronic calendar or that coincide with scheduled locations and/or activities of the user, or other factors that enable the service options to be tailored to meet verified or anticipated needs and desires of the user. As described elsewhere herein, in an event that the foreign jurisdiction is not known within a predetermined degree of confidence or may be one or more of multiple possible jurisdictions, generic or estimated upgrade options can be included in the determined options. In example embodiments, the user's home wireless telecommunications service provider determines the upgrade options. From block 304, the process moves to block 306.

In block 306, the determined upgrade options are provided to the user for review and selection. This can be done, for example, by the user's home wireless telecommunications service provider providing the upgrade options to the user's device(s) for display to the user, along with relevant descriptive information and optionally queries to gather additional information from the user, so that the user can view the information on the user's device and respond accordingly. The options and additional information can be provided in email, Short Message Service (SMS), via data service to a software application on the user's device, in a web page displayed to the user on the user's device, or in any other appropriate fashion, and responses or selections from the user can be returned to the user's home wireless telecommunications service provider in the same or different ways. As noted elsewhere herein, in example embodiments block 306 is performed while the user's device(s) is still in communication with the home wireless telecommunications service provider, for example in communication with the home telecommunications service provider network 112 shown in FIG. 1. From block 306, the process moves to block 308.

In block 308, the home wireless telecommunications service provider receives a selected upgrade option from the user, and/or one or more of a reply that declines the upgrade options, a reply that requests additional upgrade options, a reply that requests a follow-up inquiry at a future time, or a reply that includes information about the user that the home wireless telecommunications service provider can use to refine or change a set of upgrade options for the user. In example embodiments and as described elsewhere herein, the home wireless telecommunications service provider receives a selected upgrade option from the user while the user's device(s) is still in communication with the home wireless telecommunications service provider, for example in communication with the home telecommunications service provider network 112 shown in FIG. 1. From block 308 the process moves to block 310.

In block 310, the user's home wireless telecommunications service provider establishes wireless telecommunications service for the user in the different or foreign wireless telecommunications jurisdiction, in accordance with the user's selection. As described in greater detail elsewhere herein, this can be done by the home wireless telecommunications service provider proactively communicating the user's selection to a foreign wireless telecommunications service provider in the foreign wireless telecommunications jurisdiction so that when the user arrives with her device(s) in the foreign jurisdiction, the user's device(s) may immediately commence using the requested level of service. In other embodiments as described in greater detail elsewhere herein, the home wireless telecommunications service provider reactively communicates the user's selection to a foreign wireless telecommunications service provider in the foreign wireless telecommunications jurisdiction, for example after the foreign wireless telecommunications service provider receives a first contact from the user's device and information identifying the user and her account with the home wireless telecommunications service provider, and then reaches out to the home wireless telecommunications service provider (for example, via the inter-network communications link 170 shown in FIG. 1) to confirm identity and subscriber status of the user and receive information regarding the user's service upgrade selection. As noted earlier, this mechanism can be useful when the user's destination foreign jurisdiction is not well known beforehand or changes. Further, and as described elsewhere herein in greater detail, establishing foreign jurisdiction wireless telecommunications service for the user can include the home wireless telecommunications service provider providing a one-time use code to the user for use in the foreign jurisdiction to activate service.

The different blocks shown in FIG. 3 can be variously combined or reordered, and variously combined in sequence or in parallel. For example, blocks 304-308 can be iteratively repeated so that the user and the home wireless telecommunications service provider exchange information until a satisfactory upgrade option is presented and selected. In addition, the process can be adapted to apply to travel that includes visits to multiple foreign jurisdictions, where the user uses upgraded telecommunications services within a first foreign wireless telecommunications service jurisdiction to communicate quickly and efficiently with the home wireless telecommunications service provider to arrange for (upgraded) wireless telecommunications services in a next foreign wireless telecommunications service jurisdiction, before leaving the first (current) foreign wireless telecommunications service jurisdiction.

Various embodiments provide technical advantages that enable greater service and functionality to be provided to users with greater efficiency and lower resource cost. For example, providing service upgrade options and receiving the user's selection and/or additional information relevant to the upgrade process while the user (and her device(s)) are still within the home wireless telecommunications service jurisdiction enables the user to efficiently receive and evaluate options, and can enable the home wireless telecommunications service provider to communicate and coordinate with the foreign wireless telecommunications service provider to establish the selected service level while the user is traveling to help ensure that the requested/selected services are available when or soon after the user arrives in the foreign jurisdiction. This enables the telecommunications service providers to use energy-efficient and/or time-efficient communications to arrange telecommunications services for the user and allows the foreign wireless telecommunications service provider to anticipate network demands and configure or allocate system resources to efficiently provide the requested services, as well as provide a seamless and satisfying experience for the user.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for upgrading a wireless telecommunications service plan for a user's wireless communications device, comprising:
    determining, via a first wireless communication network in which the user's wireless communication device is located, and based on a movement trajectory of the user's wireless communication device, that a user is traveling to a different wireless communications jurisdiction;
    determining, prior to the user traveling to the different wireless communications jurisdiction, service upgrade options for the user's wireless communications device in the different wireless communications jurisdiction, at least one of the service upgrade options selected based on one or more of historic service usage in foreign telecommunications jurisdictions or specific activities scheduled in a foreign telecommunications jurisdiction for the user, and the at least one service upgrade comprising an indication of at least one second wireless carrier network within the different wireless communications jurisdiction;
    providing the determined service upgrade options to the user's wireless communications device for selection by the user;
    receiving a selection of one or more of the determined service upgrade options; and
    communicating with the at least one second wireless carrier network within the different wireless communications jurisdiction to establish service for the user upon detecting the user's communication device within the different wireless communications jurisdiction in accordance with the selection from the user.

2. The method of claim 1, wherein the determining that the user is traveling to a different wireless communications jurisdiction includes detecting the user's
    presence in a location that is among a plurality of locations associated with international travel that includes international airports.

3. The method of claim 1, wherein the determining that the user is traveling to a different wireless communications jurisdiction includes detecting a trajectory of the user's movements toward a telecommunications service boundary and a distance from the boundary that is less than a predetermined threshold value.

4. The method of claim 1, wherein the determining that the user is traveling to a different wireless communications jurisdiction includes matching the user's current activity to an historic pattern of the user's past travel to different wireless communications jurisdictions.

5. The method of claim 1, wherein the determining that the user is traveling to a different wireless communications jurisdiction includes determining from at least one of electronic communications or calendar information on the user's wireless communications device that the user has one or more of travel plans involving the different wireless communications jurisdiction, travel arrangements to the different wireless communications jurisdiction, or scheduled activities in the different wireless communications jurisdiction.

6. The method of claim 1, wherein the providing, receiving and establishing are completed before the user enters the different wireless communications jurisdiction.

7. The method of claim 1, wherein the service upgrade options are determined based at least in part on one or more of the user's historic selection of service upgrade options in prior travel to different wireless communications jurisdictions, or the user's scheduled activities or specific destinations within the different wireless communications jurisdiction.

8. The method of claim 1, wherein the establishing service includes communicating with a telecommunications service provider in the different wireless communications jurisdiction to set up wireless communications service in the different wireless communications jurisdiction for the user in accordance with the selection from the user.

9. A non-transitory computer readable storage medium comprising instructions that, when executed by at least one processor, cause the processor to perform:
    determining, via a first wireless communication network in which the user's wireless communication device is located and based on a movement trajectory of the user's wireless communication device, that a user is traveling to a different wireless communications jurisdiction;
    determining, prior to the user traveling to the different wireless communications jurisdiction, service upgrade options in the different wireless communications jurisdiction for a wireless communications device of the user, at least of the service upgrade options selected based on one or more of historic service usage in foreign telecommunications jurisdictions or specific activities scheduled in a foreign telecommunications jurisdiction for the user, and the at least one service upgrade comprising an indication of at least one second wireless carrier network within the different wireless communications jurisdiction;
    providing the determined service upgrade options to the user's wireless communications device for selection by the user;
    receiving a selection of one or more of the determined service upgrade options; and
    communicating with the at least one second wireless carrier network within the different wireless communications jurisdiction to establish service for the user upon detecting the user's communication device within in the different wireless communications jurisdiction in accordance with the selection from the user.

10. The computer readable storage medium of claim 9, wherein the providing, receiving and establishing are completed before the user enters the different wireless communications jurisdiction.

11. A network device, comprising:
    at least one processor;
    a network interface;
    a storage device coupled to at least one processor; and software instructions stored in the storage device, wherein execution of the software instructions by the at least one processor configures the network device to perform:

determining, via a first wireless communication network in which the user's wireless communication device is located and based on a movement trajectory of the user's wireless communication device, that a user is traveling to a different wireless communications jurisdiction;

determining, prior to the user traveling to the different wireless communications jurisdiction, service upgrade options for the user's wireless communications device in the different wireless communications jurisdiction, at least one of the service upgrade options selected based on one or more of historic service usage in foreign telecommunications jurisdictions or specific activities scheduled in a foreign telecommunications jurisdiction for the user, and the at least one service upgrade comprising an indication of at least one second wireless carrier network within the different wireless communications jurisdiction;

providing the determined service upgrade options to the user's wireless communications device for selection by the user;

receiving a selection of one or more of the determined service upgrade options; and communicating with the at least one second wireless carrier network within the different wireless communications jurisdiction to establish service for the user upon detecting the user's communication device within in the different wireless communications jurisdiction in accordance with the selection from the user.

12. The network device of claim 11, wherein the determining that the user is traveling to a different wireless communications jurisdiction includes detecting the user's presence in a location that is among a plurality of locations associated with international travel that includes international airports.

13. The network device of claim 12, wherein the determining that the user is traveling to a different wireless communications jurisdiction includes detecting that the user's wireless communications device is onboard an aircraft and has access to a telecommunications system onboard the aircraft.

14. The network device of claim 11, wherein the determining that the user is traveling to a different wireless communications jurisdiction includes detecting a trajectory of the user's movements toward a telecommunications service boundary and a distance from the boundary that is less than a predetermined threshold value.

15. The network device of claim 11, wherein the determining that the user is traveling to a different wireless communications jurisdiction includes matching the user's current activity to an historic pattern of the user's past travel to different wireless communications jurisdictions.

16. The network device of claim 11, wherein the determining that the user is traveling to a different wireless communications jurisdiction includes determining from at least one of electronic communications or calendar information on the user's wireless communications device that the user has one or more of travel plans involving the different wireless communications jurisdiction, travel arrangements to the different wireless communications jurisdiction, or scheduled activities in the different wireless communications jurisdiction.

17. The network device of claim 11, wherein the establishing includes sending a weblink to the user that, when accessed by the user via the user's wireless communications device, automatically triggers activation of a predetermined service upgrade option associated with the weblink.

18. The network device of claim 11, wherein the providing, receiving and establishing are completed before the user enters the different wireless communications jurisdiction.

19. The network device of claim 11, wherein the service upgrade options are determined based at least in part on one or more of the user's historic selection of service upgrade options in prior travel to different wireless communications jurisdictions, or the user's scheduled activities or specific destinations within the different wireless communications jurisdiction.

20. The network device of claim 11, wherein the establishing service includes communicating with a telecommunications service provider the at least one second wireless carrier network in the different wireless communications jurisdiction to set up wireless communications service in the at least one second wireless carrier network different wireless communications jurisdiction for the user in accordance with the selection from the user.

* * * * *